United States Patent [19]

Kim

[11] Patent Number: 5,535,339
[45] Date of Patent: Jul. 9, 1996

[54] DUAL PROCESSOR CONTROLLED COMPACT DISK-INTERACTIVE SYSTEM

[75] Inventor: Cheol Y. Kim, Suwon, Rep. of Korea

[73] Assignee: Goldstar Co., Ltd., Seoul, Rep. of Korea

[21] Appl. No.: 394,036

[22] Filed: Feb. 24, 1995

[30] Foreign Application Priority Data

Feb. 25, 1994 [KR] Rep. of Korea .................... 94-34173

[51] Int. Cl.⁶ ................ G06F 13/36; G11B 7/00
[52] U.S. Cl. .............. 395/280; 395/728; 364/230.6; 364/DIG. 1; 369/47; 369/48; 358/342
[58] Field of Search .................... 395/280, 728, 395/200 T; 369/47, 48; 358/342

[56] References Cited

U.S. PATENT DOCUMENTS 4,570,220  2/1986  Tetrick et al. ................ 395/306
5,247,358  9/1993  Richards ....................... 358/139
5,261,057  11/1993  Coyle et al. .................... 395/308
5,309,249  3/1994  Ishii ............................ 358/342
5,377,331  12/1994  Drerup et al. ................. 395/293
5,437,464  8/1995  Terasima et al. ............... 273/434
5,446,714  8/1995  Yoshio et al. .................. 369/48
5,473,595  12/1995  Hayashi et al. ................ 369/124

Primary Examiner—Christopher B. Shin
Attorney, Agent, or Firm—Jacobson, Price, Holman & Stern

[57] ABSTRACT

A compact disk-interactive (CD-I) system which can reproduce CD-ROMs programmed using different codes as well as general compact disks for use as a multimedia appliance. Besides a first CPU for controlling the operation of the system, a CD drive, and video and audio output devices, the CD-I system includes a second CPU for decoding data from a CD-ROM, a memory for storing the operation system of the second CPU, a bus arbitration logic for arbitrating the operation priority of the system bus between the first and second CPU, and a programmable array logic for controlling the bus arbitration logic in accordance with the code type of the reproduced data.

2 Claims, 2 Drawing Sheets

DUAL PROCESSOR CONTROLLED COMPACT DISK-INTERACTIVE SYSTEM

BACKGROUND OF THE INVENTION

1. Field of the Invention

The present invention relates to a compact disk-interactive system which is a home multimedia appliance utilizing a compact disk.

2. Description of the Related Art

Compact disk-interactive (hereinafter referred to as CD-I) systems digitally store and reproduce from five inch optical disks texts, graphics, data, etc. in combination with high quality audios, still pictures, or motion pictures. A CD-I system enables a user to use the above-mentioned information in a conversational manner.

A prior art CD-I system is illustrated in FIG. 1. Referring to FIG. 1, the prior art CD-I system comprises a central processing unit (CPU) 11 for controlling and executing the operation of the system, an erasable and programmable read only memory (EPROM) 12 including a compact disk real time operating system (CD-RTOS) as the operating system of the CD-I system which enables a user's program input, and a nonvolatile random access memory (NVRAM) 13 for preserving data in case of power-off.

The prior art CD-I system is also provided with a host interlace peripheral controller (HIPC) 14 for controlling the interface between the CPU 11 and peripheral devices, a compact disk drive (CD drive) 15 for storing or reading information on a compact disk, a compact disk interface controller (CDIC) 31, a video output section 20, an audio output section 30, and a system bus 16 composed of an address bus and a data bus required to transmit addresses and data among the above-mentioned devices. Any CPU of a 68000 series manufactured by Motorola Co. Ltd. may be employed in the CD-I system.

The CD-RTOS is a multiprogramming operating system for a CDI system utilizing a compact disk. The CD-RTOS performs real time multiprogramming in the foreground, while performs batch processing in the background. Also, according to the CD-RTOS, a program input from the disk and a program output thereto are automatically performed. The CD-RTOS further provides basic functions such as resource allocation, interrupt processing, scheduling, input/output management, program management, etc. required for a user to configure a specific real time software.

As illustrated in FIG. 1, the audio output section 30 is provided with an audio signal processor (ASP) 32, and an audio digital-to-analog converter (ADAC) 33. The video output section 20 is provided with a video decoder and system controller (VDSC) 21, a RAM 22 for storing the operation data of the system, and a video digital-to-analog converter (VDAC) 23.

The operation of the prior art CD-I system as constructed above will be described in detail.

When a compact disk is inserted in the CD drive 15, data is read from the disk by an optical pickup device (not illustrated) in the CD drive 15, and then it determines whether the read-out data is audio data, video data, or program data. If the read-out data is determined as compact disk-digital audio (CD-DA) data which corresponds to a pure audio signal, it is not sent to the CPU 11, but is directly sent to the ASP 32 under the control of the CDIC 31. The ASP 32 processes the data and outputs a digital audio signal to the ADAC 33. The ADAC 33 converts the digital audio signal to an analog audio signal.

If the data read out from the disk is determined as data including video data and program data, such as compact disk-graphic (CD-G) data, compact disk-extended graphic (CD-EG) data, CD-I data, photo-compact disk (photo-CD), etc., the CDIC 31 sends the video data and the program data to the CPU 11 through the system bus 16. In this case, the video data is processed through the VDSC 21 and the VDAC 23 to be outputted as a video signal, and the program data is processed through the HIPC 14 to be properly sent to the peripheral devices.

Specifically, if the read-out data is CD-G data or CD-EG data, which includes both audio data and video data, the audio data is processed in the audio output section 30 and the video data is decoded by means of the CD-TROS stored in the EPROM 12. The VDSC 21 receives the decoded video data, and accordingly, outputs a digital video signal composed of red (R), green (G), and blue (B) color signals with predetermined color rates, respectively. The digital video signal is then converted to an analog video signal through the VDAC 23.

Meanwhile, if the read-out data is CD-I data, the audio data is generally processed by the audio output section 30. However, in case of a sound map mode for optionally outputting sound by the user, the audio data is stored in the RAM 22 through the VDSC 21 and is then read therefrom when required. The video data is sent to the RAM 22 through the VDSC 21 by means of direct memory access (DMA). In this case, if one sector of the RAM 22 is fully occupied, the VDSC 21 first decodes the data format of the video data and determines the coding type thereof. The coding type of the CD-I video data may be one among a color look up table (CLUT) type coding, a run length (RL) coding, and a delta YUV (DYUV) coding. The video data is then decoded in accordance with its coding type to be outputted as a digital video signal composed of R, G, and B color signals. The output digital video signal is converted to an analog video signal through the VDAC 23. At this time, data movement and proper data process are performed by the CD-RTOS stored in the EPROM 12.

The DMA is a method of performing direct data input/output between a peripheral device and a memory, not by way of a CPU, and thus is mainly used in a system having a large amount of input/output data. The DMA can increase the calling rate of the system.

However, the prior art CD-I system employs a 68000 series CPU and thus has no compatibility with software programmed using an 80 series code. For instance, though the 68000 series CPU identifies the instruction code of "COPY" with "10010001", the 80 series CPU may not do so, and thus the same instruction code cannot be used in common between the two CPUs. Consequently, the prior art CD-I system cannot reproduce a compact disk-read only memory (CD-ROM) programmed using the 80 series code.

SUMMARY OF THE INVENTION

It is an object of the present invention to provide a compact disk-interactive system which can compatibly reproduce CD-ROMs using a different instruction code besides general compact disks.

In order to achieve the above object, there is provided a compact disk-interactive system comprising:

a first central processing unit for controlling the operation of said system;

a compact disk drive for reading and storing data on a compact disk;

video and audio output means for outputting video and audio signals under the control of said first central processing unit;

a compact disk interface control means;

a system bus;

a second central processing unit, connected to said system bus, for decoding data read out from a compact disk read only memory programmed using a code different from that of said compact disk;

a memory for storing an operating system of said second central processing unit;

a bus arbitration logic means, connected between said first and second central processing units, for arbitrating the operation priority of said system bus therebetween; and a programmable array logic means, connected between said compact disk interface control means and said bus arbitration logic means, for controlling said bus arbitration logic means in accordance with the code type of said data reproduced through said compact disk drive.

BRIEF DESCRIPTION OF THE DRAWINGS

The above object and other features and advantages of the present invention will become more apparent by describing the preferred embodiment thereof with reference to the accompanying drawings, in which.

DETAILED DESCRIPTION OF THE PREFERRED EMBODIMENT

A CD-I system in accordance with the present invention is described below with reference to FIGS. 2 and 3.

Figure 2:
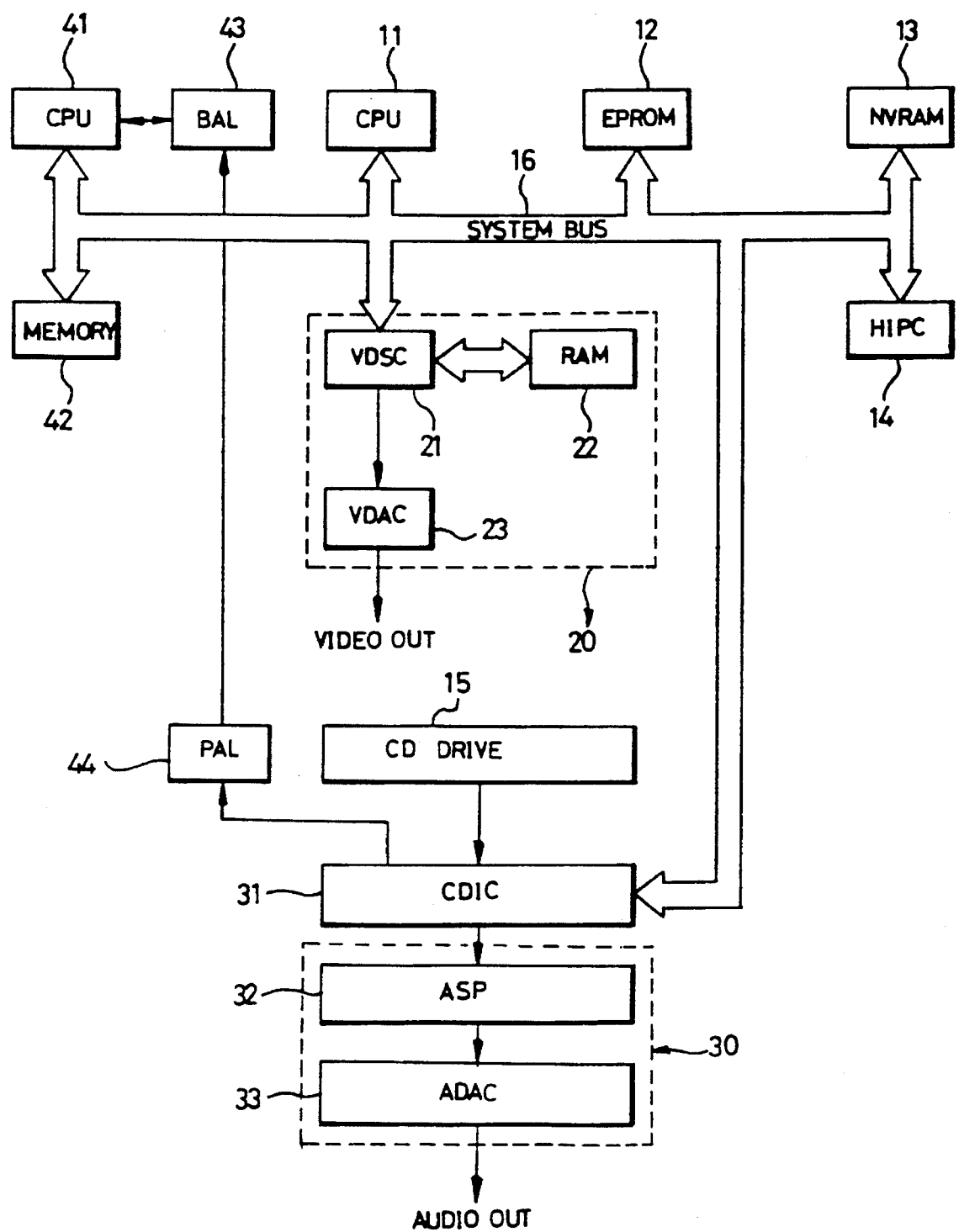
FIG. 2 is a schematic block diagram of the CD-I system according to the present invention.

As illustrated in FIG. 2, a CD-I system embodying the present invention includes a second central processing unit (CPU) 41 of a 80 series, a memory 42 for storing the operating system of the second CPU 41, a bus arbitration logic section (BAL) 43 connected to a chip select terminal of the second CPU 41, and a programmable array logic section (PAL) 44 connected to a chip select terminal of the BAL 43.

The operation of the present CD-1 system will be described in detail.

Figure 1:
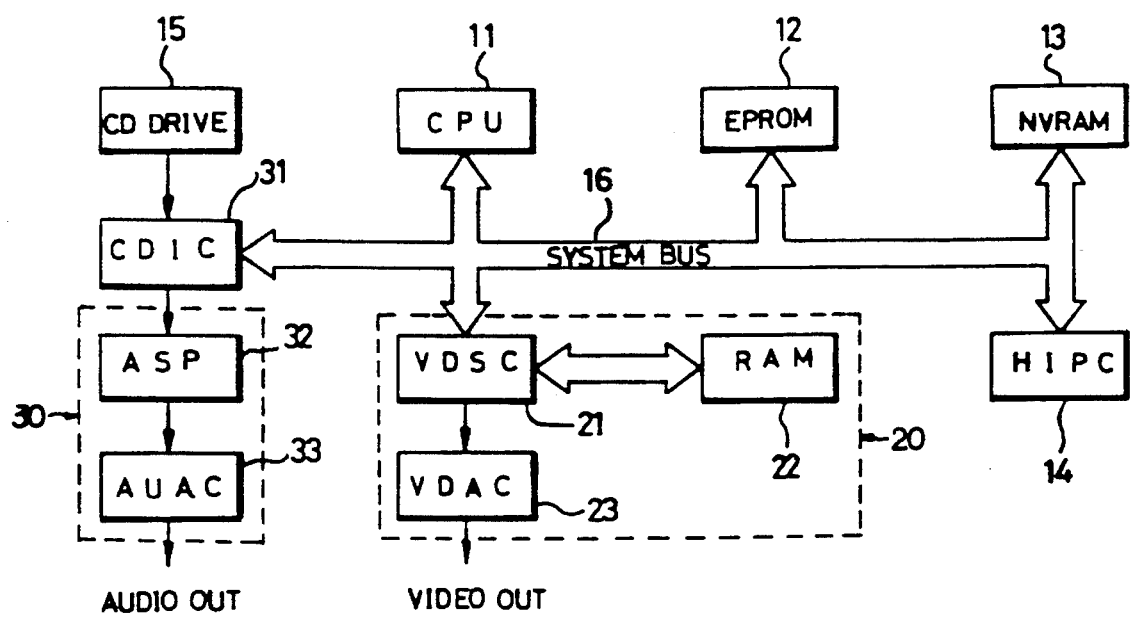
FIG. 1 is a schematic block diagram of the prior art CD-I system.
Figure 3:
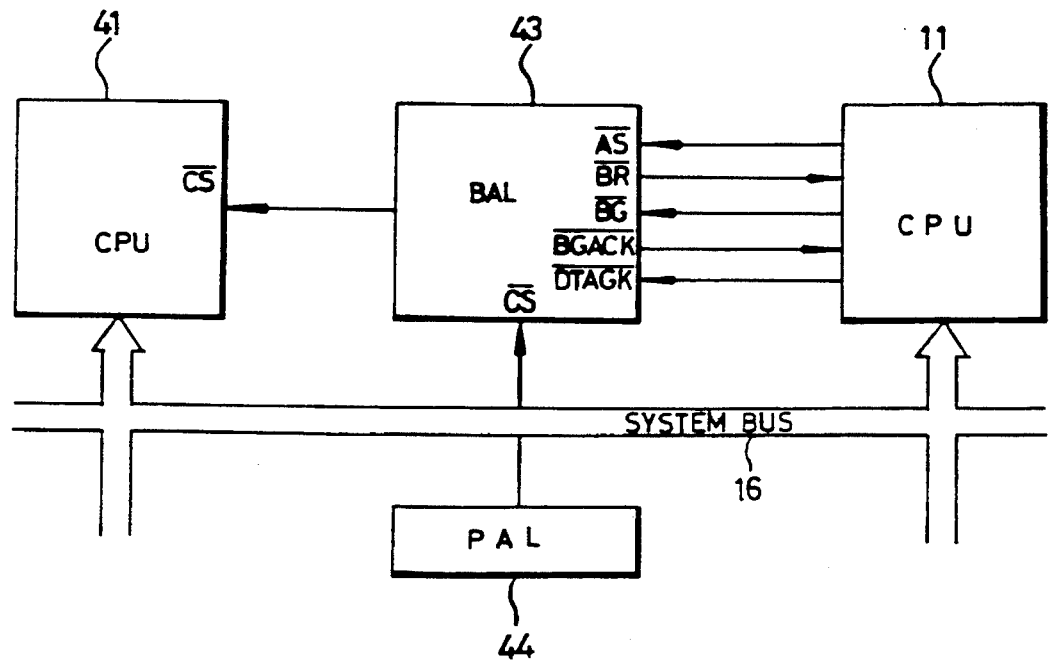
FIG. 3 is a partially detailed block diagram of the CD-I system according to the present invention.

As illustrated in FIG. 3, interconnection between the first and second CPUs is shown in detail. The second CPU 41 of a 80 series operates in accordance with the operating system stored in the memory 42, and decodes a CD-ROM programmed using a 80 series code. Specifically, if a 'low' level signal is applied from the BAL 43 to the chip select terminal $\overline{CS}$ of the second CPU 41 which is connected to the BAL 43, data read out by the CD drive 15 is transmitted to an audio output section 30, a video output section 20, and an HIPC 14 through a system bus 16. The BAL 43 assigns the operation priority of the system bus 16, which the first CPU 11 has held, to the second CPU 41. The chip select terminal CS of the BAL 43 is connected to the PAL 44 and the operation of the BAL 43 is controlled by the PAL 44.

The CDIC 31 determines whether the disk inserted in the CD drive 15 is a CD-ROM or not. If so, the CDIC 31 outputs a corresponding signal to the PAL 44, and accordingly, the PAL 44 provides a 'low' level signal to the chip select terminal of the BAL 43, causing the BAL 43 to assign the operation priority of the system bus 16 to the second CPU 41.

If the disk is not determined to be a CD-ROM, the PAL 44 provides a 'high' level signal to the chip select terminal of the BAL 43, so that the operation priority of the system bus 16 is assigned to the first CPU 11.

When a 'low' level signal is applied to the chip select terminal f the BAL 43, the BAL 43 provides to the first CPU 11 a 'low' level bus request signal for requesting the operation priority of the system bus. Then, the first CPU 11 provides to the BAL 43 a 'low' level bus grant signal for assigning the operation priority of the system bus no the second CPU 41 when the working bus cycle is completed. When the bus grant signal is received, the BAL 43 first checks if an $\overline{AS}$ signal and a $\overline{DTAGK}$ signal, which are for confirming the presence of received data, are 'high' level. At this time, a 'high' level $\overline{AS}$ signal identifies that the first CPU 11 does not use the system bus at present, and a 'high' level $\overline{DTAGK}$ signal identifies that any peripheral device does not use the system bus at present. If both the $\overline{AS}$ signal and the $\overline{DTAGK}$ signal are 'high' level, the BAL 43 provides to the first CPU 11 a 'low' level $\overline{BGACK}$ signal for identifying that the BAL 43 has held the operation priority of the system bus. At this time, the BAL 43 provides a 'low' level signal to the chip select terminal of the second CPU 41 so that the second CPU 41 can use the system bus 16, and accordingly, the second CPU 41 outputs data read out from the CD-ROM to the video output section 20, the audio output section 30, and the HIPC 14 through the system bus 16. Consequently, any software designed using the 80 series code can be reproduced.

As described above, the CD-I system according to the present invention can reproduce CD-ROMs programmed using a different code as well as general compact disks such as CD-DAs, CD-Gs, CD-EGs, photo-CDs, CD-Is, etc.

Whereas the present invention has been described in particular relation to the drawings attached hereto, it should be understood that other and further modifications, apart from those shown or suggested herein, may be made within the spirit and scope of this invention.

What is claimed is:

1. A compact disk-interactive system comprising:

a first central processing unit for controlling the operation of said system;

a compact disk drive for reading and storing data on a compact disk;

video and audio output means for outputting video and audio signals under the control of said first central processing unit;

a compact disk interface control means;

a system bus;

a second central processing unit, connected to said system bus, for decoding data read out from a compact disk-read only memory programmed using a code different from that of said compact disk;

a memory for storing an operating system of said second central processing unit;

a bus arbitration logic means, connected between said first and second central processing units, for arbitrating the operation priority of said system bus therebetween; and a programmable array logic means, connected between said compact disk interface control means and said bus arbitration logic means, for controlling said bus arbitration logic means in accordance with a code type of said data reproduced through said compact disk drive.

2. A compact disk-interactive system as claimed in claim 1, wherein said first and second central processing units are of a 68000 series and of a 80 series, respectively.

* * * * *